June 2, 1936.  R. B. BOURNE  2,043,030
SOUND ATTENUATING DEVICE
Filed April 2, 1935  3 Sheets-Sheet 1
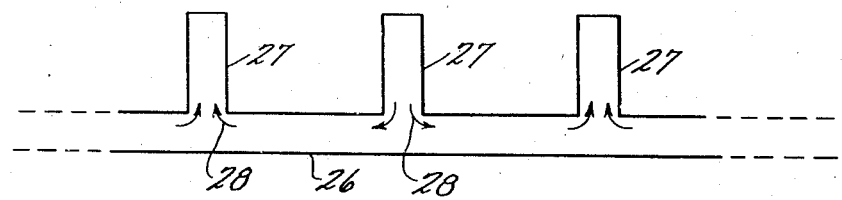
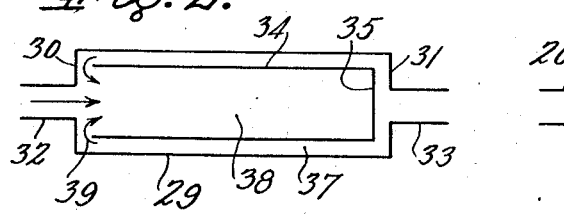
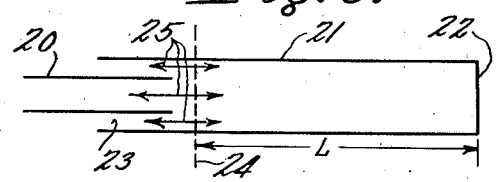
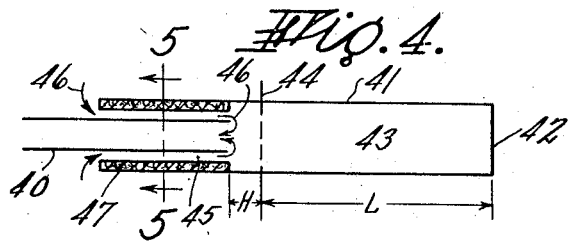
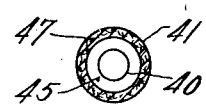
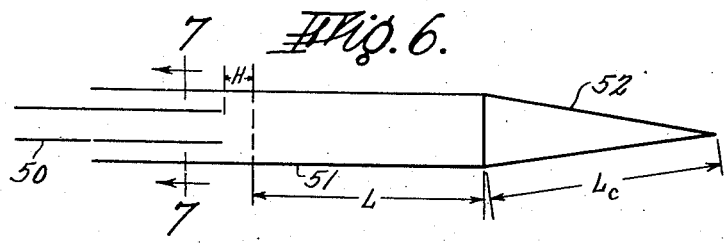
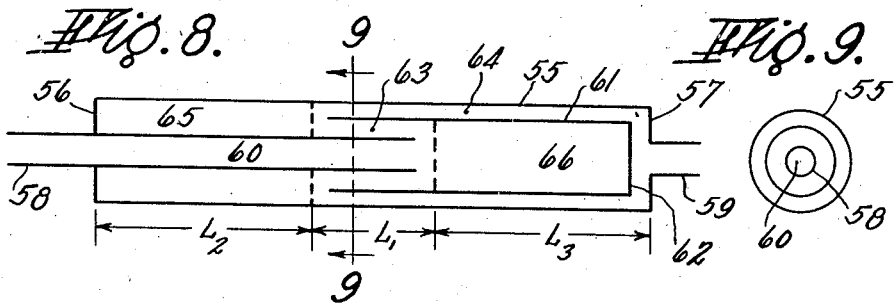
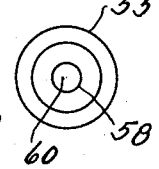
INVENTOR
ROLAND B. BOURNE
BY Chapin + Neal
ATTORNEYS

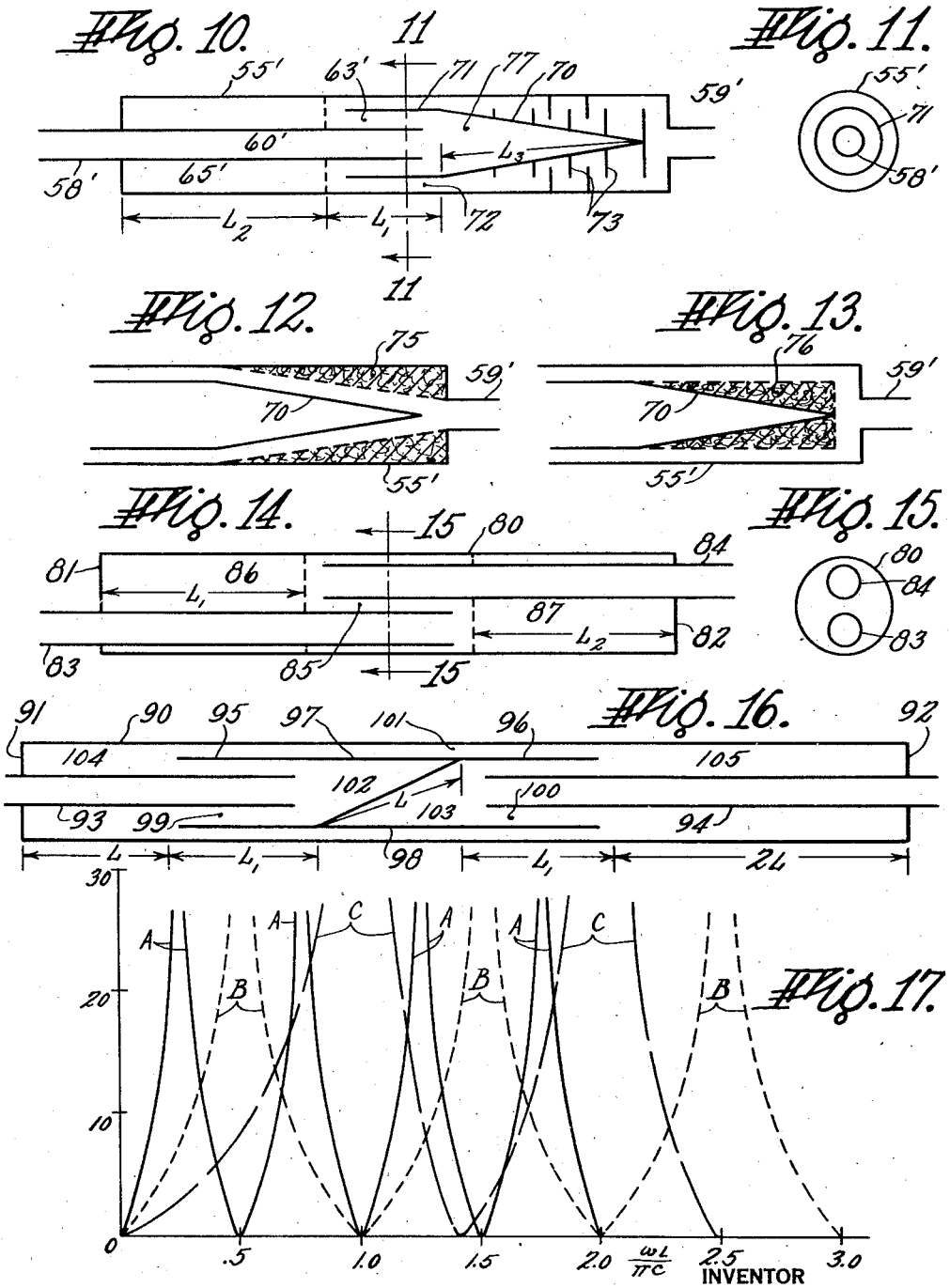

June 2, 1936.  R. B. BOURNE  2,043,030
SOUND ATTENUATING DEVICE
Filed April 2, 1935  3 Sheets-Sheet 3
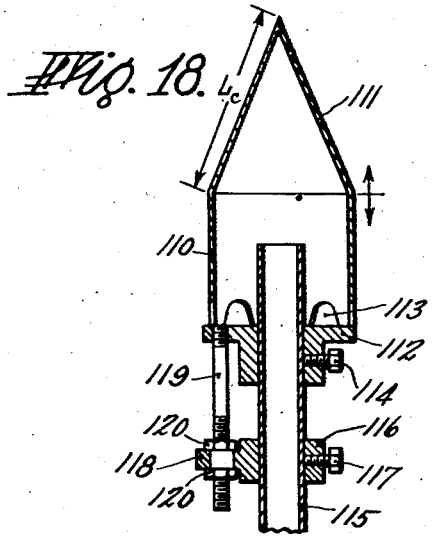
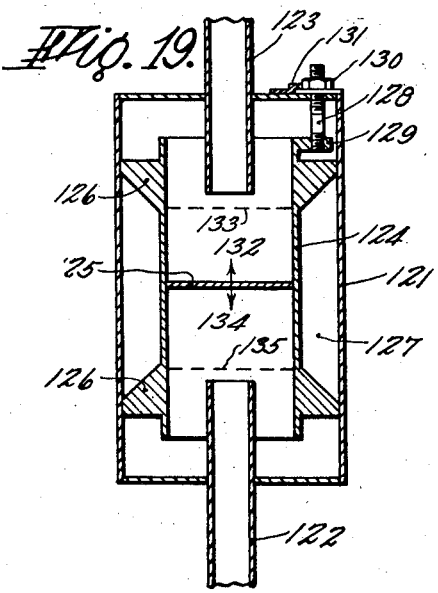
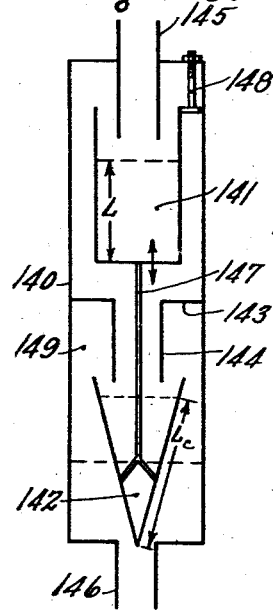
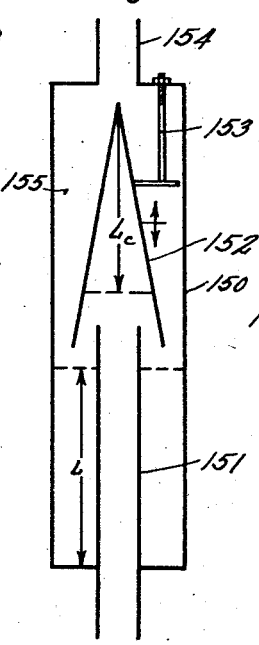
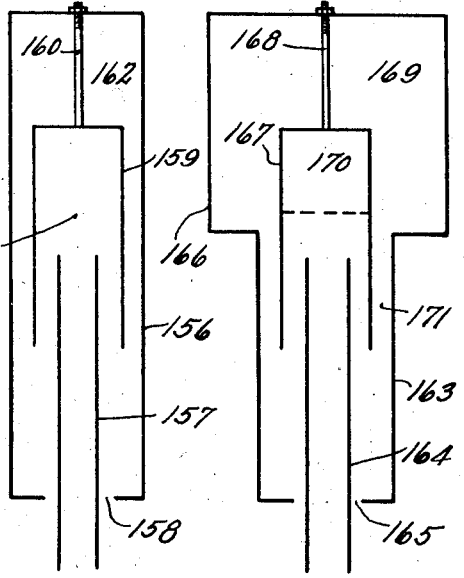
INVENTOR
ROLAND B. BOURNE
BY
Chapin & Neal
ATTORNEYS Patented June 2, 1936

2,043,030

UNITED STATES PATENT OFFICE 2,043,030

SOUND ATTENUATING DEVICE

Roland B. Bourne, Hartford, Conn., assignor to The Maxim Silencer Company, Hartford, Conn., a corporation of Connecticut Application April 2, 1935, Serial No. 14,370

35 Claims. (Cl. 181—0.5)

The present invention relates to improvements in sound attenuating devices employing reactive acoustic side branches of the wave motion or phase displacement type.

Non-dissipative acoustic sidebranches, acoustically coupled to a main sound conducting channel, attentuate, in the main channel, sound waves of frequencies dependent upon the reasonance frequencies of the sidebranches. It is possible to design frequency selective devices in which the several sidebranches function more or less independently of each other, or in which two or more sidebranches react together to give a series of pass and attenuation bands, this latter action being peculiar to devices of the wave filter type. One section of an acoustic wave filter comprises an acoustic sidebranch and a portion of a main sound conducting channel to which the sidebranch is acoustically coupled. The minimum number of sections necessary in order to obtain filtering action—as distinguished from an independent reactive action of the separate sidebranches—is two. Both types of devices, as above described, are represented in the several embodiments shown in the drawings, the present invention being applicable to either. As will be more particularly described below, the invention relates particularly to the manner in which the sidebranches are coupled to the main channel.

Heretofore the known ways of coupling an acoustic sidebranch to a main sound conducting channel have necessitated a change in the direction of propagation of the wave entering or leaving the sidebranch. In one common form of coupling the sidebranches are disposed at right angles to the main channel, so that the sound waves are forced to bend through ninety degrees both on entering and leaving the sidebranch. In another type of coupling the main channel diverges at the mouth of the sidebranch, generally continuing beyond this point in annular form. In my invention no change in the direction of a sound wave entering or leaving the sidebranch is necessary, and the closest possible coupling between the sidebranch and its associated section of the main channel is afforded.

While the purpose and objects of the present invention can best be understood after the specific embodiments are discussed, they can be briefly summarized at this point. Referring in the first place to the more strictly acoustical features of the invention, one of its objects is to provide a combination of an acoustic sidebranch and a main channel in which the sound waves will move in substantially straight lines both in entering and in leaving the sidebranch. Another object is to improve the coupling between the sidebranch and the main channel, permitting this coupling to be practically speaking at a maximum and reducing the inertance at the opening of the sidebranch. So to speak, this gives the sidebranch a better grip on the main channel, improving and enhancing its effect; and the correspondence between theory and practice is improved since the conductivity of the coupling approaches nearer to the value of infinity which is often assumed in theoretical discussions. A further object of the invention is to permit the use of a sidebranch having a substantially larger cross-sectional area than that of the main channel without requiring a restriction in the side branch adjacent the coupling zone and while retaining the coupling between the sidebranch and the main channel at substantially its desired maximum value. Another object is to minimize the disturbances, due to the inertance and resistance superadded at the junction zone on account of changes in direction of the sound waves, which have in the past caused practical silencers to depart from the characteristics theoretically expected of them.

Turning now to the structural side of the invention, it will be seen as the description proceeds that a much more compact device is made possible, and furthermore that a large number of partitions and headers formerly necessary have been omitted. A further object is to permit the silencing device to be set or adjusted so as to have its maximum effectiveness at the most objectionable sound frequency for which it is designed, by a simple process of changing the acoustic properties of the device rather than altering the physical dimensions of the members which in part define the sidebranches. Indeed, this is accomplished without changing the conductivity of the coupling between the main channel and the sidebranch, a result which has not previously been possible as far as I am aware. Inasmuch as in this invention the sidebranches have their adjustable surfaces formed by a gaseous boundary rather than by a physical wall or partition, it will be seen that no tight acoustic fits are necessary in order to secure the desired adjustment. An additional object is to provide a simple method of separating structurally adjacent acoustic elements along the main channel, where this is desired in order that they may act independently instead of in parallel. Additional objects, both acoustic and structural, will appear from the following description and claims.

The capability of adjustment which is afforded by the present invention is of particular utility where the silencing device is to be operated upon installations having substantially constant frequency characteristics. This is the case, for example, where internal combustion engines are operated at a constant speed. In spite of the fact that an individual engine may have constant characteristics, it has hitherto been necessary as a practical matter to design the silencing equipment to embrace a very wide range of sound frequencies, including many frequencies which may be non-existent at the particular location where the equipment is to be applied, for the reason that the frequency characteristics of a standard engine or the like will vary with local conditions such as piping arrangements. In most cases, the sound spectrum of the device to be silenced is dominated by a single fundamental frequency and its integrally related overtones. If these are accurately known the silencing equipment can be designed with corresponding accuracy, but as a matter of manufacturing and sales economy it is not always possible to obtain prior knowledge with the requisite degree of particularity. It is of considerable commercial importance, therefore, to be able to design the silencing equipment of the general type to handle the species of sound spectrum expected to be present, and to adjust the device in the field to compensate for variations due to local conditions. For example, it is known that certain types of Diesel engines in certain sizes may be expected to emit sound waves of frequencies lying in a certain bracket, and there is no necessity for considering sound frequencies which do not exist in obnoxious quantities in a given type of installation. Nevertheless, in prior practice it has not been commercially possible to take advantage of this known generic sound spectrum, whereas in devices constructed in accordance with my invention the silencing equipment when once designed for the type and size of engine can be adjusted in the field so that the variations due to local conditions of the particular engine installation can be fully compensated for.

Heretofore, sound attenuating devices having adjustable acoustic sidebranches have been difficult of practical mechanical construction or have had undesirable acoustic features to such a degree that the obvious advantages of this type of device could not be commercially utilized. According to my invention, I vary the length of a linear sidebranch without changing the acoustic coupling thereinto and without the use of sliding joints, packing, or the like. Furthermore, since in accordance with my invention I utilize acoustic sidebranches of the linear type, I am enabled throughout the range of adjustment to preserve the integral acoustic relation between the fundamental response frequency and its harmonic overtones. As such a linear sidebranch is made shorter, its cross sectional area remaining the same, it responds somewhat less to its higher overtones, but this is compensated for by the fact that higher frequencies generated by a commercially installed Diesel engine, for instance, are more lacking in serious harmonic content than are the lower frequencies. It will be seen that these two facts more or less compensate each other. In any event, the degree of adjustment need not be large, since as already pointed out, the fundamental sound frequency will be known to lie within certain limits which in practice are not widely separated.

Referring to the drawings,

Fig. 1 is a diagrammatic view of a conventional wave filter illustrating the manner in which the sound waves must bend in passing into and out of the sidebranches;

Fig. 2 is a diagrammatic view of a single sidebranch coupled to a main channel at a point where the main channel diverges to become an annular instead of a tubular conduit;

Fig. 3 is a diagrammatic view of a sidebranch coupled to the main channel in accordance with my invention;

Fig. 4 is a view similar to Fig. 3 but showing a slightly different construction;

Fig. 5 is a section on line 5—5 of Fig. 4;

Fig. 6 is a similar view showing a different type of sidebranch;

Fig. 7 is a section on line 7—7 of Fig. 6;

Fig. 8 is a similar view of a further modification;

Fig. 9 is a section on line 9—9 of Fig. 8;

Fig. 10 is a similar view of a further modification;

Fig. 11 is a section on line 11—11 of Fig. 10;

Figs. 12 and 13 are details corresponding to a portion of Fig. 10 but illustrating further modifications;

Fig. 14 is a similar view of a structure similar in general outline to some previously used in mufflers of the gas expansion type, but of different proportions and having different acoustic properties;

Fig. 15 is a section on line 15—15 of Fig. 14;

Fig. 16 is a similar view of a structure having useful sound attenuating properties;

Fig. 17 is a series of curves showing the theoretical frequency-attenuation characteristics for the embodiment shown in Fig. 16;

Fig. 18 is a sectional view of an acoustic silencing device of the type shown in Fig. 6, illustrating one way in which the desired adjustment may be obtained;

Fig. 19 is a similar view of a different type of silencing device; and

Figs. 20 to 23 are diagrammatic views of other types of silencing devices embodying the invention, in which the adjusting devices are indicated diagrammatically only.

The manner in which the invention is carried into practice can now be considered. It has been found that, by carrying the main channel into a tubular member of larger cross sectional area than the conduit and closed at its further end, both a portion of the tubular member beyond the main channel and also the annular space within the member and around the conduit act as a part of the main channel, leaving the remainder of the space within the tubular member acting as a sidebranch. This is illustrated in Fig. 3, which in comparison with Figs. 1 and 2 will assist in understanding the essentials of the invention in a simple form. Referring first to Fig. 3, the main sound conduit 20 is extended inwardly at one end of a tubular member 21 closed at its end 22 but spaced from it to present an annular passage 23. This annular passage serves as a continuation of the main sound conducting channel the first part of which was formed by the conduit 20. The direction of gas or wave flow through the device is not important, although this type of silencer is generally used as an intake silencer, particularly for air compressors. In such a case the conduit 20 is coupled to the compressor and the gas flow through it is to the left as viewed in the figure, the main wave flow occurring in the opposite direction. I have found that instead of stopping at the end of the conduit 20 as would be expected, the main sound conducting channel extends into the member 21 a short distance beyond it, so that the interior of the member 21 to the left of the dotted line 24 serves as a part of the main channel while the portion of the member to the right of this line serves as a sidebranch.

This action produces what may be referred to as a folding or reflexing of the main channel, having many useful properties. In the first place, it will be observed that whereas the direction of the main channel changes abruptly through one hundred and eighty degrees, the sound waves, contrary to what might have been supposed, suffer no change of direction at all as they enter or as they leave the sidebranch. This can best be understood by considering the path of the waves as they enter the sidebranch from the conduit 20. As the waves first leave the conduit they will of course pass directly down the tubular member 21 until they reach the header at the end 22. Here they are reflected, passing back through the member 21 in a reverse direction. During its travel through the sidebranch the waves have spread out so that they may be considered as plain waves extending across the entire cross-sectional area of the sidebranch. It will be clear that the outer portion of the wave can pass directly out through the annular space 23, suffering no change of direction at this point. The continuity of direction between the waves in the conduit 20 and those in the annular space 23 is indicated by the arrows 25. This is of course, a greatly simplified discussion, but for an understanding of the present invention it will be unnecessary to consider the more complex phenomena of wave interference which enter into the silencing action of the device.

By changing the amount which the conduit 20 projects into the member 21 the effective length L of the sidebranch can be varied as desired. No change in the conductivity of the coupling between the main channel and the sidebranch is made by this adjustment, and the physical dimensions of the parts involved remain the same. In most cases the simplicity of the adjustment is not the same as in the idealized case presented here, and I will point out below various ways in which the adjustment can be obtained, even with the device in operation, in more complex structures. It is only necessary to point out here the fact that it is the use of the folded or reflexed main channel which makes this ease of adjustment possible.

One further feature which is clear from the idealized case should be pointed out before proceeding with the description of the more elaborate devices in which the invention finds its principal commercial uses. One end boundary of the sidebranch is formed by the header 22. The other end boundary of the sidebranch is, however, not formed by a physical structure at all, but is of purely acoustical character. The surface indicated in the drawings by the line 24 may in most cases be considered as a plane extending transversely to the axis of the member 21, and forms just as effective a boundary for the reactive sidebranch as if it were made by a physical header or partition. Its location is determined purely by the acoustical properties of the device. In practice the surface 24 will be spaced from the end of the conduit 20 a distance of the general order of magnitude of the end correction of the conduit 20. This end correction, as is well understood, is a function of the radius of the conduit 20. Particularly in the more elaborate embodiments of the invention this use of an acoustical boundary instead of a partition or header is of great utility in simplifying the structure, for internal headers are among the more difficult and expensive parts of an acoustic silencer to construct. In general there will be no headers necessary in devices constructed in accordance with my invention except those at the remote ends of the sidebranches, and these serve in most cases as the end closures for the main casing.

The difference in the direction of wave flow over the types of coupling shown in Figs. 1 and 2 is marked. Fig. 1 shows a conventionalized wave filter embodying a main channel 26 and a series of closed sidebranches 27, usually equally spaced along the main channel. The arrows 28 show the device as operating in an attenuation band, where suppression of the undesired sound frequencies occurs by interaction between the successive sidebranches. It will be noted that the arrows in successive sidebranches point in opposite directions, the sound waves at one sidebranch passing into and producing a state of compression, while the waves at the next sidebranch are passing out of it leaving within it a state of reduced pressure. The particular point of note here is that the sound waves, both when they enter and when they leave the sidebranches, have to turn through an angle of ninety degrees.

In Fig. 2 is shown a structure having a considerable acoustic similarity to that of Fig. 3 but not employing the present invention. In this case there is an outer casing 29 provided with headers 30 and 31 to which are secured the inlet and outlet conduits 32 and 33. Within the casing 29 is a tubular member 34 having at one end a header 35 and being open at the other end in adjacency to the inlet conduit 32. There is formed between the member 34 and the inside of the casing 29 an annular space 37 which, together with the conduits 32 and 33, forms the main sound conducting channel. Here again the path of the sound waves entering and leaving the sidebranch 38 is shown by the arrows 39. Entering the sidebranch from the conduit 32 the sound waves have a straight passage, but in passing between the sidebranch and the annular passage 37 the waves have to turn through an angle of one hundred and eighty degrees. One further feature of the invention, mentioned above, is particularly evident from a comparison of Figs. 2 and 3. In the structure of Fig. 2 there are three headers 30, 31, and 35. In the acoustically similar structure of Fig. 3 there is but one header 22. The increase in simplicity of mechanical structure due to the use of the invention is obvious.

The embodiment of Figs. 4 and 5 is slightly changed from the idealized form in order to adapt it particularly to use on commercial air compressors and the like. It comprises a cylindrical pipe 40, partly telescoped into the coaxially disposed cylindrical member 41 which is closed at its far end by the header 42, thus forming the sidebranch 43. This linear acoustic sidebranch extends a distance L from a region denoted by the dotted line 44 to the header 42. As pointed out above the region 44 may for all practical purposes be considered a plane transverse to the axis of the cylindrical sidebranch 43, and is distant from the inside end of the conduit 40 a distance H. The value of H is easily determined experimentally and in many cases is approximately equal to the "end correction" for the conduit 40. The main channel comprises the interior of the conduit 40, that portion of the interior of the member 41 embraced by the distance H, and the annular passage 45 formed between the exterior of the conduit 40 and the interior of the member 41. In this case the arrows 46 are used to indicate the direction of gas flow and not the straight line motion of the sound waves. Preferably positioned within the annular space 45 is a body of sound absorbing material 47 extending uniformly along its length, contiguous to the inner surface of the member 41, the outer surface of the conduit 40, or both. Since, as is preferable in attenuating devices of this character, the cross sectional area of the sidebranch 43 is made on the order of four times that of the conduit 40, there is ample space between the two telescoped members both for the sound absorbing material and the annular portion of the main channel.

In accordance with well established acoustic principles, the sidebranch 43 of Fig. 4 offers maximum attenuation to sound frequencies centering at $$\frac{\omega L}{\pi C} = 0.5, 1.5, 2.5, \text{etc.} \quad (1)$$

where $\omega = 2\pi \times$ frequency
$C$ = velocity of sound in the medium
$L$ = acoustic length of the sidebranch The sound absorbing material 47 offers attenuation to sound waves of relatively high frequency, such as breathing noise from the compressor, and also serves as an acoustic termination for the main channel and its associated sidebranch. Used as an intake silencer the conduit is connected to the intake of the compressor and air is drawn in through the annular passageway as shown by the arrows 46. In this case the sidebranch 43 also functions as a reservoir which assists in smoothing out the irregular air flow normal to a reciprocating pump.

Figs. 6 and 7 show an embodiment similar to Fig. 3, except that the sidebranch comprises a cylindrical section in series with a conical section. The centrally disposed conduit 50 extends coaxially and telescopically within the cylindrical member 51, one end of which is open to the atmosphere and the other end of which communicates directly with the open large end of a complete cone 52. There is thus formed a closed linear sidebranch having a cylindrical portion of length $L$ and a conical portion of length $L_c$, as shown. The resonance frequencies of such a sidebranch may be shown to be given by $$\cot \frac{\omega L_c}{C} - \frac{1}{\frac{\omega L_c}{C}} = -\cot \frac{\omega L}{C} \quad (2)$$

where these resonance frequencies are determinable as the roots of the equation. These frequencies will not ordinarily all be in harmonic relation. For instance, if $L_c = L$, the resonance frequencies occur at $$\frac{\omega L}{\pi C} = 0.37, 1, 1.47, 2, 2.49, 3, \text{etc.} \quad (3)$$

Equation (3) shows that the frequencies tend toward harmonic relation as higher overtones are reached. In ordinary practice it is convenient to make $L=0$, in which case the sidebranch resolves itself into a simple complete cone with open base, and the resonance frequencies may be shown to be given by $$\frac{\omega L}{\pi C} = 1, 2, 3, 4, \text{etc.} \quad (4)$$

Thus the device of Fig. 2 may be readily designed to attenuate a full series of harmonically related sound frequencies, such as occur in many industrially made noises. The value of H is determined in a manner similar to that discussed in connection with Fig. 4. It should be noted that if it is desired to make $L=0$ the conduit 50 is not moved quite up to the boundary between the cylindrical and conical sections, but stops short of it by the distance H as previously discussed.

Figs. 8 and 9 show an embodiment of the invention in which are incorporated two linear acoustic sidebranches, each of which is positioned in line with a portion of the main sound conducting channel in accordance with the principles of the invention. It comprises the cylindrical casing 55 with end closures 56 and 57 affording connection for inlet and outlet connections 58 and 59. The inlet conduit 58 continues inwardly from the header 56 and forms the portion 60 of the main sound conducting channel through the device. Coaxially nested within the casing 55 is a cylindrical casing 61 closed by a header 62 at one end. The other end of the casing 61 is open and surrounds a portion of the inlet conduit 58. There is thus formed an annular channel 63 between the conduit 58 and the casing 61, and a second annular channel 64 between the casings 55 and 61. The main sound conducting channel through this form of device is formed by the channel 60, the annular channels 63 and 64, and the outlet conduit 59. The casing 61 is materially shorter than the outer casing 55, and is so disposed and proportioned that an acoustic sidebranch 65 of length $L_2$ is formed between the outside of the conduit 58 and the inside of the casing 55; and a second acoustic sidebranch 66 of length $L_3$ is formed within the casing 61. The annular channel 63 previously referred to extends from the sidebranch 65 to the sidebranch 66 and is of length $L_1$, being greater than the physical length of the overlapped portions of the members 58 and 61 by two of the distances H previously mentioned, these two distances not being in general equal. It is possible to choose the acoustic lengths $L_2$ and $L_3$ so that very useful frequency-attenuation characteristics will result. For instance, if $L_2 = L_3/2$, there results two sets of overlapping attenuation characteristics peaked at $$\frac{\omega L_3}{\pi C} = 0.5, 1, 1.5, 2.5, 3, 3.5, 4.5, 5, \text{etc.} \quad (5)$$

By making the cross sectional area of the sidebranches large compared to that of the main conducting channel, the widths of the frequency bands attenuated are made larger. For the condition $L_2 = L_3$ there results an acoustic wave filter, the attenuation characteristics of which may be determined from $$\cosh \Gamma = \cos \frac{\omega L_1}{C} - \frac{S_2}{2S_1} \sin \frac{\omega L_1}{C} \tan \frac{\omega L_2}{C} \quad (6)$$

where
$S_1$ = cross sectional area of the main channel
$S_2$ = cross sectional area of the sidebranches the size of the casing 61 being preferably taken so that the cross sectional area of the sidebranch 66 is the same as that of the annular sidebranch 65. It can be shown that, for such a filter, the attenuation bands center around frequencies determinable from $$\frac{\omega L_2}{\pi C} = \frac{N}{2} \text{ where N is an odd integer} \quad (7)$$

Another device making use of the principles of the invention is shown in Figs. 10 and 11. The construction is similar to that of Fig. 8, excepting that the sidebranch 66 of that figure is replaced by a complete closed cone 70 attached at its open base to a cylindrical member 71 coaxially arranged within the casing 55'. In Fig. 10 those parts which remain the same as in Fig. 8 are denoted by primed numerals. The member 71 is telescoped over one end of the centrally disposed conduit 60' to form the annular channel 63', a second annular channel 72 being formed between the members 55' and 70. Since there is more space between the exterior surface of the cone 70 and the inside of the casing 55' than is necessary for the passage of gas through the device, I have shown a baffle system 73 attached to the outside of the cone in order to obtain additional attenuation for sounds of high frequency, transients, and the like. This baffle system may be replaced by a sound absorbing lining 75 as shown in Fig. 12, or by a sound absorbing covering 76 for the cone as shown in Fig. 13. It will be seen that the annular linear sidebranch 65' of Fig. 10, having an acoustic length of $L_2$, is coupled closely both to the annular channel 63' and to the annular channel 72, and that the conical sidebranch 71, having an acoustic length $L_3$, is closely coupled both to the central channel 60' and to the annular channel 63'. This latter channel, as in the analogous case of Fig. 8, has an acoustic length of $L_1$. By making $L_2 = L_3$, maximum attenuation in the device occurs for frequencies determinable from the equation $$\frac{\omega L}{\pi C} \quad 0.5, 1, 1.5, 2, 2.5, \text{etc.} \quad (8)$$

This is seen to be an improvement over the characteristics of the device of Fig. 8, represented by Equation (5), in that attenuation at values of $$\frac{\omega L}{\pi C} = 2, 4, \text{etc.}$$

is provided.

In Figs. 14 and 15, the principles of the invention are applied to a very simple construction which is physically similar to, but of different proportions from and therefore acoustically different from, certain devices which are old in the art of mufflers of the gas expansion type. This device comprises a cylindrical casing 80, having end closures 81 and 82 through which pass inwardly directed conduits 83 and 84 disposed parallel and eccentric to the axis of the casing. The conduits extend inwardly of the end headers 81 and 82 somewhat more than half the length of the casing, so that there is formed an intermediate section 85 of the main conducting channel through the device, comprising the space between the outside of the two conduits 83 and 84 and the inside of the casing 80. The length and diameter of the casing is chosen with respect to the diameters of the conduits so that there is thus formed an eccentric annular linear sidebranch 86 of length $L_1$ directly opposite the inner end of the conduit 84 and a similar sidebranch 87 of length $L_2$ directly opposite the inner end of the conduit 83. These sidebranches function in the same manner as the sidebranches 65 and 66 of Fig. 8. The lengths of the conduits 83 and 84 may be chosen with respect to the length of the casing 80 so that predetermined groups of sound frequencies may be highly attenuated.

Fig. 16 shows another embodiment of the invention wherein use is made of two annular linear sidebranches of lengths L and 2L respectively and of constant cross sectional area along their lengths; and also of two conical linear sidebranches of length L. The device comprises a casing 90 having end closures 91 and 92 through which pass inwardly extending centrally disposed conduits 93 and 94. Overlapping these conduits and spaced from the wall of casing 90 are two coaxially disposed cylinders 95 and 96. Affixed to the inner ends of the cylindrical members are two nested cones 97 and 98, the apexes of which are closed and the bases of which open directly into the cylindrical members. The main channel is formed by the conduits 93 and 94 and by the intermediate annular channels 99, 100 and 101, the first two of which are formed between the conduits 93 and 94 and the cylindrical members 95 and 96 respectively, and the latter of which is formed between the casing 90 on the one hand and the exterior of the members 95, 96, 97, and 98 on the other. The two annular channels 99 and 100 have a length $L_1$. Two conical sidebranches 102 and 103 are formed by the interiors of the cones 97 and 98; and two annular linear cylindrical sidebranches 104 and 105 are formed between the inside of the casing 90 and the outsides of the conduits 93 and 94, these latter sidebranches having the lengths L and 2L respectively. The sidebranches do not begin in the acoustical sense at the ends of the conduits or of the cylindrical members 95 and 96, but at a distance slightly spaced therefrom as has been pointed out in dealing with some of the preceding modifications. One noteworthy feature of this embodiment, which brings out in sharp relief one of the principal advantages of the present invention, is that in spite of the fact that there are four sidebranches separated at intervals along a main sound conducting channel there are no internal partitions or headers necessary. In each of these four sidebranches, also, the path of the sound waves both entering and leaving is strictly rectilinear, with the benefits pointed out in the previous discussion.

The theoretical attenuation characteristics for this device, for the special case where the area of the annular sidebranches and the area of the bases of the conical sidebranches are four times that in the main conducting channel, are shown in Fig. 17. In that figure the curve A shows the attenuation due to the sidebranch 105, the curve B shows the attenuation due to the sidebranch 104, and the curve C shows the attenuation due to the two conical sidebranches 102 and 103. The overall attenuation is the sum of the individual curves shown, and as will be apparent presents no pass bands throughout the range of operation of the device.

In Fig. 18 is shown a silencing device of a simple type, generally corresponding to that shown in Fig. 6. The acoustic sidebranch structure is formed from a cylindrical section 110 to which is secured a conical end 111. The two sections act as a unit in the manner above described, and are held in place by a hub 112 to which the cylindrical section is secured by spot welding or by other suitable means. The cylindrical section is provided adjacent the hub with cut away portions 113 permitting flow of gas or air. The hub 112 is secured as by a set screw 114 to a conduit 115 which serves as a part of the main sound conducting channel, this channel being reflexed inside of the cylindrical section in the manner fully discussed above. In order to secure accurate adjustment a collar 116 is secured to the conduit as by a set screw 117, and is provided with a lug 118 through which passes a threaded rod secured to the hub 112 and adjustably held to the lug by nuts 120. To adjust the device the set screw 114 is loosened, and the sidebranch structure moved back and forth as required by turning the nuts 120. After the required position has been found the hub 112 is again anchored by tightening the set screw 114.

Fig. 19 shows a different form of silencing device, in this case using two sidebranches coupled to the main conducting channel in spaced relation, the two sidebranches being adjusted simultaneously but in opposite senses. This device comprises a casing 121 through the ends of which pass conduits 122 and 123. Within the casing is a tubular member 124, having a central partition 125 and held in spaced relation to the inner wall of the casing by lugs 126 projecting from the member and slidably engaging the casing. The lugs are comparatively narrow in width, so that they do not interfere with the passage of gas or sound along the annular passageway 127. A threaded rod 128 is secured to a lug 129 on the member 124, and is held in adjusted position by a flanged nut 130, the flange of which lies underneath a holding piece 131 on the outside of the casing. By turning the nut 130 the member 124 can be moved up or down in the casing without varying the lateral position in which it is held by the lugs 126. There are formed in this device two linear acoustic sidebranches; a sidebranch 132 the length of which is determined by the distance from the central partition 125 to the line 133 spaced from the end of the conduit 123 by a distance corresponding to the distance H in Fig. 4; and a sidebranch 134 the length of which is determined by the distance from the central partition to a similar line 135. As the member 124 is moved up or down the sidebranches are respectively increased or decreased in their acoustic lengths, without in any way changing the sizes of the walls which enclose them, or requiring any sliding joints along their bounding walls.

In Fig. 20 the casing 140 encloses two linear acoustic sidebranches, a cylindrical sidebranch 141 and a conical sidebranch 142. These are separated by a central partition 143 having a short cylindrical neck 144, extending into adjacency with the open end of the cone. A conduit 145 extends through one end of the casing into the cylinder which defines the cylindrical sidebranch. A second conduit 146 is attached to the opposite end of the casing. The cylindrical and conical members 141 and 142 are connected by a rod 147, and are adjusted simultaneously by a rod and nut connection 148 similar to that shown in Fig. 19. By making the acoustic lengths L and $L_c$ of these sidebranches the same, two overlapping sets of attenuation bands result whereby attenuation is had for a series of sound frequencies given by $$\frac{\omega L}{\pi C} = \frac{\omega L_c}{\pi C} = 0.5, 1.0, 1.5, 2.0, 2.5, 3.0, \text{etc.}$$

If the neck 144 is made relatively short the main sound channel is reflexed twice at the open end of the cone, while if it is made substantially longer an annular cylindrical linear sidebranch 149 is created which adds its attenuation characteristics to those of the other sidebranches.

The device of Fig. 21 has a casing 150 into one end of which a conduit 151 extends for a considerable distance. This conduit terminates inside a conical member 152 which is supported within the casing by an adjustable rod 153 similar to those previously described. In this as well as in the other diagrammatic showings the lugs which hold the interior members in spaced relation to the casing are omitted. Their action, however, is the same as that of the lugs 126 of Fig. 19. The main conduit is formed in part by the conduit 151, in part by the outlet conduit 154, and in part by the annular space 155 between the cone and the casing. In this embodiment there is formed a conical sidebranch of acoustic length $L_c$ and an annular cylindrical sidebranch of acoustic length L. The main channel is reflexed within the conical member 152, and is reflexed again in the annular space between the conduit 151 and the inside of the casing, so that the ends of the two sidebranches are spaced somewhat from the ends of the conduit 151 and from the cone 152 respectively. By moving the conical member longitudinally in the casing the lengths of the two sidebranches will be varied simultaneously, in this case in the same sense.

Fig. 22 shows a device which is particularly suitable for use as an intake silencer with only one connecting conduit, the other end of the device being open to the atmosphere. Into one end of the casing 156 a conduit 157 enters for a substantial distance. The conduit is suitably connected to the casing for mutual support, but an annular opening 158 is left around the conduit for communication with the outside air. Also supported by suitable lugs within the casing is a cylindrical member into which the conduit enters, this member being held in adjusted position as by a rod connection 160. There is thus formed a cylindrical sidebranch 161 and an annular sidebranch 162 partly annular and partly cylindrical, the main channel being reflexed within the member 161. Here the two sidebranches are simultaneously adjustable in the opposite sense.

Fig. 23 illustrates the applicability of the invention to a problem of a somewhat different nature. There is a casing 163 into which a conduit 164 projects in a manner so as to leave an annular passage 165 between them. The casing is enlarged as at 166 at its upper end, and within it a cylindrical member 167, closed at its upper end, is supported by means of an adjustable rod 168. By this means a volumetric sidebranch 169 is formed, the boundaries of which are defined by the enlarged end of the casing and by the outside of the cylindrical member 167. A second sidebranch 170 is formed within the member 167 in the space above the open end of the conduit 164. As the member 167 is lowered to make the sidebranch 170 smaller the volumetric sidebranch 169 is increased in volume. At the same time the conductivity represented by the annular passage 171 is decreased since it is made longer by a lowering of the cylinder 167 into the main part of the casing 163. These effects permit a great range in frequency response to be obtained. In this case the main sound channel is reflexed at the upper end of the conduit 164.

It will be understood that the devices shown in Figs. 3, 6, 8, 10, and 16 can be provided with adjusting means of the same type as those just described. In none of these cases is the advantage of the reflexed main channel disturbed by the adjustment, nor is there any requirement for sliding connections which must be preserved fluid tight and which might in use cause trouble due to leakage of gas or sound.

The several modifications shown are not intended as being exclusive, but are indicative of the wide range of application of the folded or reflexed main channel which is the subject of this invention. Many other applications will occur to those skilled in the art, and it is my intention in the appended claims to define this invention as broadly as the state of the art will permit.

I claim:

1. An acoustic silencing device including a main sound conducting channel and a sidebranch, the main channel being reflexed at its point of coupling to the sidebranch, the reflexed channel having rectilinear coupling to the sidebranch on both sides of said point of coupling.

2. An acoustic silencing device including a main sound conducting channel and a hollow member having one closed and one open end, the main channel extending into and being reflexed within the open end of the hollow member.

3. An acoustic silencing device including two partially telescoped members spaced from each other, the larger of the two members being closed at its end remote from the point of entry of the other member; the smaller member, the annular space between the two members, and a portion of the space within the larger member beyond the end of the smaller member, acting as the main conducting channel, and the remainder of the space within the larger member acting as a sidebranch.

4. An acoustic sidebranch formed from a hollow member closed at one end and means for forming an acoustic, non-physical boundary located within the volume enclosed by the member and determining the second end of said side branch.

5. An acoustic sidebranch completely defined by a hollow member closed at one end and by a reflexed main channel contained within the other end of said member.

6. An acoustic silencing device comprising a main sound conducting channel and a plurality of closed sidebranches spaced along the channel, the channel and the several sidebranches being so positioned relative to each other that the sound waves may pass in a straight line from each section of the main channel into each sidebranch and in a straight line from that sidebranch into the next section of the main channel.

7. A linear acoustic sidebranch having defining walls and means for imparting to said sidebranch an acoustic length less than the length of said defining walls.

8. An acoustic sidebranch and a main sound conducting channel coupled to each other for rectilinear transmission of sound waves from the channel into the sidebranch and out of the sidebranch into the next succeeding section of the main channel.

9. An acoustic silencing device including a tubular member closed at one end and opened at the other, and a conduit extending into the open end of the tubular member so as to leave an annular passage between them; the interior of the tubular member, from the closed end thereof to a point spaced from the end of the conduit a distance of the order of magnitude of the end correction of the conduit, functioning as an acoustic sidebranch and the remainder of the interior of the elements functioning as a main sound conducting channel.

10. An acoustic silencing device including three telescoped members positioned to present annular spaces between them, the intermediate member being closed at its end remote from the innermost member and the outer member being closed around the innermost member at one end and having an opening at the other end, the end of the innermost member being spaced from the closed end of the intermediate member to produce an acoustic sidebranch and the open end of the intermediate member being spaced from the closed end of the outermost member to produce a second acoustic sidebranch.

11. An acoustic silencing device comprising a main sound conducting channel, a pair of closed conical acoustic sidebranches coupled at their larger ends to the main channel, and a pair of acoustic sidebranches of uniform cross sectional area as a function of length coupled to the main channel intermediate the two conical sidebranches.

12. An acoustic silencing device comprising a casing, a hollow structure within the casing and spaced from it so as to provide an annular passageway between it and the inner surface of the casing, said hollow structure having cylindrical end sections open at their outer ends and a pair of conical intermediate portions each closed at its smaller end and coupled at its larger end to the adjacent cylindrical portion, and a conduit extending from each end of the casing into the adjacent cylindrical portion of the hollow structure and being sufficiently small so as to leave an annular passage between it and the inner surface of the cylindrical portion, said annular passageways, the conduits, a portion of the interior of the hollow structure, and a portion of the interior of the casing adjacent the ends of the conduits and of the cylindrical sections respectively, serving as sections of a main sound conducting channel, and the interior of the conical sections and the space between the casing and the conduits adjacent the ends of the casing serving as acoustic sidebranches.

13. An acoustic silencing device including a hollow member having a cylindrical section open at one end and a conical section connected thereto and closed at its smaller end, and a conduit projecting partially into the cylindrical section of the hollow member and terminating short of the conical section, the interior of the conical section and a portion of the cylindrical member extending from the conical section to a zone slightly spaced from the end of the conduit functioning as an acoustic sidebranch and the conduit, the annular space between the conduit and the interior of the cylindrical section, and the space within the cylindrical member from the end of the conduit to said zone, functioning as the main sound conducting channel.

14. An acoustic silencing device comprising a casing having inlet and outlet openings at its ends, a hollow member positioned within the casing and having one closed and one open end, the closed end being positioned adjacent to but spaced from one of said openings, the open end being positioned remote from the other end of the casing, and the outside of the hollow member being spaced from the inside of the casing so as to provide an annular space between them, and a conduit extending inwardly from the second of said openings to a point within the hollow member an appreciable distance from the closed end thereof and being sufficiently smaller than said hollow member to provide an annular space between them; the conduit, the annular space between the conduit and the hollow member, the annular space between the hollow member and the casing, a space within the hollow member adjacent the end of the conduit, and a space within the casing adjacent the open end of the hollow member, serving as a main sound conducting channel through the device, and the remainder of the space within the hollow member and the remainder of the space at the conduit end of the casing serving as acoustic sidebranches spaced apart along the main channel.

15. An acoustic silencing device comprising a casing having inlet and outlet openings at its ends, a hollow member having a cylindrical section open at one end and a conical section connected thereto and closed at its smaller end, the closed end of the hollow member being spaced from one of said openings, and the outside of the hollow member being spaced from the inside of the casing so as to provide an annular space between them, and a conduit extending inwardly from the second of said openings to a point within the cylindrical section of the hollow member spaced from the larger end of the conical section, and being sufficiently smaller than the cylindrical part of the hollow member to provide an annular space between them; the conduit, the annular space between the conduit and the cylindrical section of the hollow member, the annular space between the hollow member and the casing, a space within the cylindrical section of the hollow member adjacent the end of the conduit, and a space within the casing adjacent the open end of the hollow member, serving as a main sound conducting channel through the device, and the conical section of the hollow member and the remainder of the space at the conduit end of the casing serving as acoustic sidebranches spaced apart along the main channel.

16. An acoustic silencing device including a conical member closed at its smaller end and open at its larger end, and a conduit extending partially into the member at its larger end, the conduit being sufficiently smaller than the larger end of the conical member to provide an annular sound conducting channel between the conduit and the inside of the conical member, a portion of the interior of the conical member beyond the end of the conduit functioning as an acoustic sidebranch and the remainder of the interior of the conical member functioning as a portion of the main sound conducting channel.

17. An acoustic silencing device including a conical member closed at its smaller end and open at its larger end, a cylindrical member attached to the larger end of the conical member and extending away therefrom, and a conduit extending into the cylindrical member towards the open end of the conical member, the conduit being sufficiently smaller than the cylindrical member to provide an annular sound conducting channel between the conduit and the inside of the cylindrical member, whereby the interior of the conical member functions as an acoustic sidebranch and said annular channel and at least a portion of the remainder of the cylindrical member functions as a portion of the main sound conducting channel.

18. An acoustic silencing device including a hollow member having a cylindrical section open at one end and a conical section connected thereto and closed at its smaller end, and a conduit projecting partially into the cylindrical section of the hollow member.

19. An acoustic silencing device including two partially and adjustably telescoped members spaced from each other, the larger of the two members being closed at its end remote from the point of entry of the other member; the smaller member, the annular space between the two members, and a portion of the space within the larger member and adjacent the end of the smaller member, forming the main sound conducting channel; and the remainder of the space within the larger member forming a closed linear acoustic sidebranch having an acoustic length determinable by the amount of projection of the smaller member within the larger member.

20. In an acoustic silencing device, a hollow member open at one end, a conduit projecting into the open end of the member to define an acoustic sidebranch therein, and means for adjusting the degree of projection of the conduit into the hollow member.

21. In an acoustic silencing device, a hollow member open at one end, and a conduit projecting into the open end of the member and terminating short of the closed end thereof a sufficient distance to define an acoustic side branch therein.

22. In an acoustic silencing device, a casing, a conduit projecting into the casing, a hollow member having one open end, said member being located within the casing with its open end partially telescoped over the end of the conduit, and means for adjusting the degree of telescoping of the hollow member and the conduit.

23. In an acoustic silencing device, a casing, a plurality of tubular conduits extending within the casing, a plurality of hollow members each having one open end and partially telescoped respectively upon the ends of the conduits, and means for adjusting the degree of telescoping of the hollow members and the conduits.

24. In an acoustic silencing device, a casing, a conduit projecting into the casing from each end thereof, a tubular, centrally divided structure mounted within the casing and partially telescoping the conduits to provide a pair of acoustic sidebranches acoustically coupled to a main sound conducting channel.

25. In an acoustic silencing device, a casing, a conduit extending into the casing from each end thereof, a tubular centrally divided member mounted within the casing and partially telescoping the conduits to provide a pair of acoustic sidebranches acoustically coupled to a main sound conducting channel, and means for adjusting the member longitudinally within the casing to vary its degree of telescoping upon the conduits.

26. In combination, a sound conduit comprising two coaxial nested passages in series, and an acoustic sidebranch wherein progressive change of phase may take place, coupled to said sound conduit at the junction point of said nested passages.

27. In combination, a sound conduit comprising two coaxial nested passages in series, and an acoustic sidebranch coupled to said conduit at the junction point between said nested passages, the cross sectional area of said sidebranch at the point of coupling being equal to the combined cross sectional areas of said passages.

28. A device according to claim 26 where said sidebranch comprises a closed cylinder of uniform cross sectional area throughout its length.

29. A device according to claim 26 wherein the cross sectional area of said sidebranch decreases as a function of distance along its length.

30. A device according to claim 26 wherein said acoustic sidebranch is in the form of a complete closed cone, open at its base.

31. An acoustic sidebranch comprising a portion having uniform cross sectional area and, in series therewith, a portion having a continuously decreasing cross sectional area.

32. An acoustic sidebranch comprising a cylinder in series with a complete closed cone.

33. A device according to claim 26 wherein said acoustic sidebranch is of uniform annular cross section throughout its length.

34. In a sound attenuating device having an annular main sound conducting passage therein, a closed acoustic sidebranch of uniform annular cross sectional area acoustically coupled to one end of said annular passage and an acoustic sidebranch of non-uniform cross sectional area acoustically coupled to the other end of said annular passage.

35. A sound attenuating device having three coaxially nested passages in series to form a part of the main sound conducting channel therethrough, an acoustic sidebranch acoustically coupled to two of said nested passages, and an acoustic sidebranch acoustically coupled to another two of said nested passages.

ROLAND B. BOURNE.